United States Patent [19]

Funderburk, Jr. et al.

[11] 3,900,635

[45] Aug. 19, 1975

[54] MULTILAYER SHRINKABLE FILM FOR POULTRY BAGS

[75] Inventors: James O. Funderburk, Jr., Bolingbrook; Stephen J. Vicik, Darien, both of Ill.

[73] Assignee: Union Carbide Corporation, New York, N.Y.

[22] Filed: Feb. 22, 1972

[21] Appl. No.: 227,789

[52] U.S. Cl. ............... 428/213; 206/65 S; 229/48 T; 260/897; 264/171; 428/218; 428/220; 428/516; 428/913
[51] Int. Cl. ............................................ B32b 27/08
[58] Field of Search ................. 161/252, 254, 402; 229/48 T; 206/65 S; 425/131; 264/171; 260/897; 156/229

[56] References Cited
UNITED STATES PATENTS

| | | | |
|---|---|---|---|
| 3,196,195 | 7/1965 | Tritsch | 264/171 |
| 3,365,520 | 1/1968 | Foster | 260/80.76 X |
| 3,481,804 | 12/1969 | Snyder | 161/252 X |
| 3,508,944 | 4/1970 | Henderson et al. | 161/252 X |
| 3,552,638 | 1/1971 | Quackenbush | 161/252 X |

Primary Examiner—George F. Lesmes
Assistant Examiner—Patricia C. Ives
Attorney, Agent, or Firm—C. F. O'Brien

[57] ABSTRACT

A multilayer shrinkable film is disclosed. The film is suitable for use in fabricating bags for frozen poultry. The film comprises:

a. a biaxially oriented first layer comprising a first ethylene polymer selected from the group consisting of ethylene homopolymer having a density not greater than about 0.93, and ethylene copolymer, said first ethylene polymer having a melt index of less than about 2.3; and b. a biaxially oriented second layer comprising a blend of an ionomer and a second ethylene polymer, said second ethylene polymer being selected from the group consisting of ethylene homopolymer having a density not greater than about 0.93, and ethylene copolymer;

wherein each layer constitutes as least about 20 percent of the total thickness of said film.

14 Claims, 2 Drawing Figures

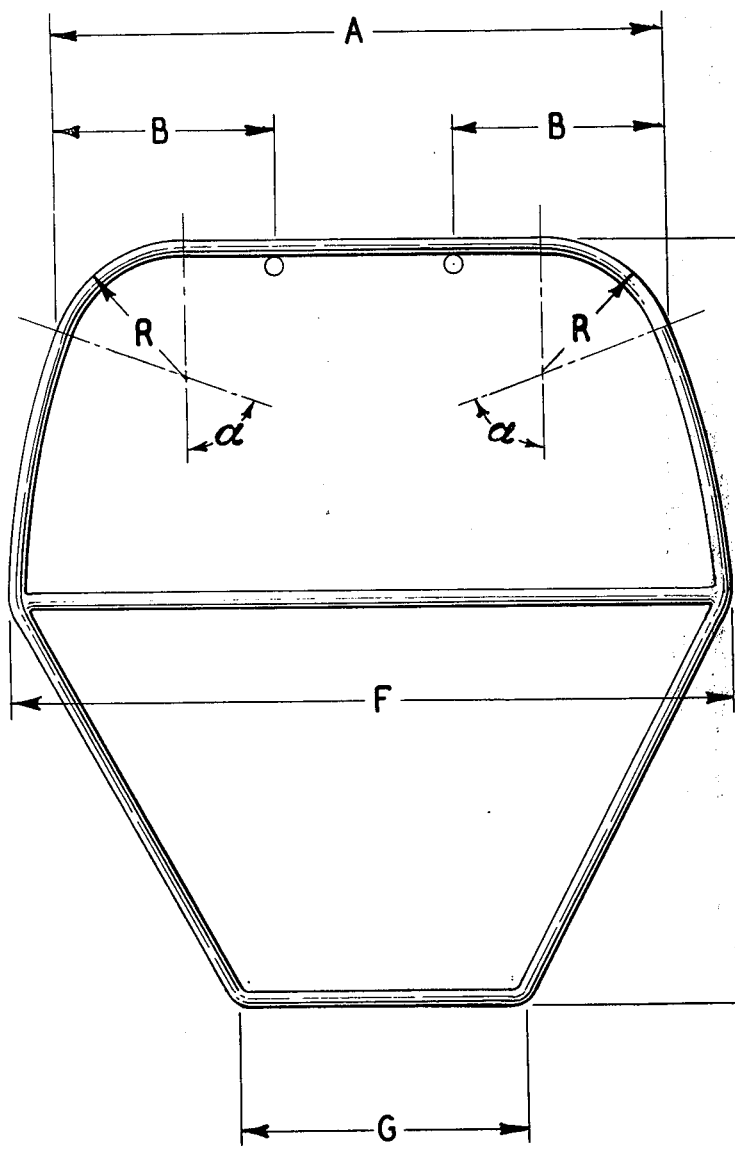

MULTILAYER SHRINKABLE FILM FOR POULTRY BAGS

The invention relates to a multilayer shrinkable film that is suitable for use in fabricating poultry bags.

The procedure that is presently being used commercially to package frozen poultry requires packaging materials having special properties, as will be seen from a summary of a typical operation used for packaging frozen turkeys. This operation includes the following:

i. a turkey is dropped into a bag that is produced from a polyolefin film;
ii. the neck of the bag is then clamped;
iii. at this point and at others during the handling, the turkey may be transported with the entire weight of the turkey being supported solely by the neck of the bag;
iv. the turkey and bag are subjected to a temperature of 90° to 95°C. for a period of up to about 7 seconds to cause the bag to shrink tightly around the turkey; and
v. the turkey is then quickly frozen and the bagged turkey is stored at temperatures as low as about −40°C.
vi. During transport of the bagged frozen turkey, continuous abrasion and impact of one packaged bird against another is probable.

An operation such as that described above requires a packaging material which has the following properties:

i. sufficient tensile strength to support the weight of the turkey; (A tensile strength in the machine direction of at least about 5,000 psi, as determined by ASTM D-882-67 test procedure, is required for this application—as a rule, bioriented plastic films easily meet this requirement.)
ii. sufficient shrinkage, that is, area reduction in the film, at 90° to 95°C. to conform to the irregular shape of the bird. This property requires that there be at least about a 25 percent linear size reduction in the direction transverse to the machine direction of the film; (This property is determined by ASTM D-2732-68 T test procedure.)
iii. there must be sufficient shrink force at 90° to 95°C. to pull the wings of the bird tightly into the body and sufficient residual shrink force to maintain a tight wrap around the bird. For instance, a shrink force in the transverse direction at 90°C. of at least about 100 grams/inch-mil is considered to be necessary; (Shrink force is that force required to prevent the film from shrinking at the temperature indicated.)
iv. the film must have sufficient seal strength so that after it has been converted into a bag by a conventional heat sealing operation, there will be no seal failure during the shrinking operation at 90° to 95°C.; and,
v. the film must have sufficient impact strength and abrasion resistance at low temperatures to protect the bird during freezing, storage, shipping and handling.

In addition to the above enumerated requirements, the film used must possess dimensional stability and have non-tacky surfaces. It must be made from a base resin that has adequate processability (e.g., the base resin should be susceptible to good thickness control), and high production efficiency (i.e., a low proportion of reject or off-spec film) at reasonable processing speed.

Three polyolefin materials have been either used or proposed for such frozen poultry packaging applications. The first is bioriented low density polyethylene. Low density polyethylene films, however, have both product and process disadvantages. It is difficult to obtain sufficient film shrinkage at 90° to 95°C. to meet the requirements indicated above, particularly with small sized bags. Also, low density polyethylene has such low melt strength that the stresses placed on the tubing at the draw point during the conventional biorientation process are often severe enough to break the bubble, thus creating poor operating efficiencies and limiting the maximum obtainable shrink that can be obtained at 90° to 95°C.

The second polyolefin film is composed of irradiated low density polyethylene, which can be biaxially oriented to obtain a film having considerable improvement both in shrink levels at 90° to 95°C., and in melt strength. However, the irradiation adversely affects the heat strength. This is a result of a reduction in the thermoplastic character of the polyethylene that is caused by irradiation induced cross-linking of the polymer chains.

A third polyolefin film that has been proposed (in U.S. Pat. No. 3,365,520) for use in poultry bags is a bioriented film of a blend of an ionomer and an ethylene homopolymer or copolymer. Such films have exceptional shrinkage and shrink force at 90° to 95°C., and excellent melt strength which provides good processing characteristics during the biorientation procedure. However, although such films can be heat sealed using conventional hot bar heat sealing equipment, the heat seals have surprisingly low strength at 90° to 95°C., which is the commonly used shrink temperature in poultry packaging.

The present invention provides a shrinkable film that overcomes the disadvantages enumerated above for the polyolefin films that have heretofore been proposed for use in making frozen poultry bags. Accordingly, it is an object of this invention to provide a shrinkable film that is suitable for use in fabricating bags for packaging frozen poultry, especialy frozen turkeys.

Another object of the invention is to provide a multilayer shrinkable film having high shrinkage and shrink force and, at the same time, maintaining good heat seal strength at the temperatures employed for shrinking.

These and other objects and advantages of the invention can be seen from the following description of the invention, and the accompanying FIGS. 1 and 2, which show front and side views of a test frame that can be employed to evaluate the seal strength of heat sealed plastic bags.

Broadly, the invention contemplates a multilayer shrinkable film that is suitable for use in fabricating bags for packaging frozen poultry. The film comprises a biaxially oriented first layer composed of an ethylene polymer having a melt index of less than about 2.3, and a biaxially oriented second layer that is a blend of an ionomer and an ethylene polymer. The first layer provides heat sealability to the film, while the second layer provides the degree of shrinkage and shrink force that the specialized application of packaging frozen poultry requires. When the film of the invention is heat sealed to form a bag, the said first layer is the inner or sealing layer of the bag.

The first layer of the film of the invention is composed of an ethylene polymer. The ethylene polymer is a film grade ethylene homopolymer having a density (by ASTM D-1505) not greater than about 0.93 (i.e., low density polyethylene), or an ethylene copolymer, the comonomer being another olefinically unsaturated monomer such as vinyl acetate, acrylic acid, methacrylic acid, alkyl acrylate such as $C_1$ to $C_4$ alkyl acrylate, or alkyl methacrylate such as $C_1$ to $C_4$ alkyl methacrylate. The ethylene polymer of the first layer has a melt index of less than about 2.3. (The melt index is determined by the method of ASTM D-1238, Procedure A, Condition E). The comonomer content of the ethylene copolymer can be up to about 20 weight percent of the polymer weight, and is preferably not more than about 5 weight percent.

The second layer of the film of the invention is a blend of an ionomer and an ethylene polymer which is either ethylene homopolymer having a density (by ASTM D-1505) not greater than about 0.93 (i.e., low density polyethylene), or a copolymer of ethylene with an olefinically unsaturated monomer such as those which were indicated above. Preferably, this ethylene polymer has a melt index of less than about 10, although it can be higher. Ionomers (as is well known to the art, e.g., see U.S. Pat. No. 3,365,520) are copolymers of ethylene with an olefinically unsaturated organic acid such as acrylic or methacrylic acid, the acid comprising from about 0.5 to about 50 mol percent of the total polymeric material, and wherein the acid is neutralized in whole or in part to produce a salt. The cations of said salts are usually alkali metal, zinc, or the like. As a general rule, the ionomer content of the second layer is from about 1 to about 60 percent by weight of said second layer. Preferred ionomer contents in the second layer are in the range of from about 5 to about 40, and more preferably from about 10 to about 30, weight percent.

The film of the invention can be produced by procedures which are analogous to those known in the art. For instance, the two layers of the film can be coextruded as a primary tube or primary bubble and cooled to a temperature below the softening point of all the materials, and subsequently bioriented by a double bubble process, such as the process described in U.S. Pat. No. 3,555,604.

Either layer can constitute from about 20 to about 80 percent of the total thickness of the film. Typical total film thickness will vary from about 1.5 to about 3 mils. Conventional additives such as slip agents, antiblocking agents, and pigments can be incorporated in the film in conventional amounts.

In the Examples, the following polymers were employed:

TABLE I

| Ident. | Ethylene Polymer Description Homopolymer or Comonomer[1] | Melt Index dg/min. | Density, gm/cc | Weight Percent Comonomer |
|---|---|---|---|---|
| A | Homopolymer | 0.1 | 0.917 | — |
| B | EA | 0.1 | | 1.5 |
| C | Homopolymer | 0.2 | 0.96 | — |
| D | do. | 0.5 | 0.9165 | — |
| E | VA | 0.8 | | 3.5 |

TABLE I-Continued

| Ident. | Ethylene Polymer Description Homopolymer or Comonomer[1] | Melt Index dg/min. | Density, gm/cc | Weight Percent Comonomer |
|---|---|---|---|---|
| F | Homopolymer | 1.1 | 0.929 | — |
| G | do. | 1.3 | 0.9185 | — |
| H | do. | 2.3 | 0.9225 | — |
| I | VA | 3.0 | | 10 |
| J | Homopolymer | 3.5 | 0.9175 | — |
| K | EA | 6.5 | | 18.5 |
| L | AA | 7.0 | | 3.5 |
| M | Homopolymer | 10.0 | 0.919 | — |
| N | VA | 20.0 | | 28 |
| O | EA | 0.28 | | 3.4 |
| P | AA | 4.0 | | 6 |

[1]EA is ethyl acrylate
VA is vinyl acetate
AA is acrylic acid

TABLE II

| Ident. | Melt Index dg/min. | Ionomer Description Description[2] |
|---|---|---|
| A | 1.2 | E/15 weight per cent MA copolymer; 53 per cent of the MA converted to the sodium salt. |
| B | 1.5 | E/12 weight per cent MA copolymer; 24 per cent of the MA converted to the zinc salt. |
| C | 0.8 | E/15 weight per cent MA copolymer; 57.5 per cent of the MA converted to the sodium salt. |
| D | 2.8 | E/15 weight per cent MA copolymer; 29 per cent of the MA converted to the sodium salt. |
| E | 4.4 | E/9 weight per cent MA copolymer; 12.4 per cent of the MA converted to the zinc salt. |

[2]MA is methacrylic acid
E is ethylene

Heat sealed bags can be fabricated from tubular plastic film by heat sealing one end of the tube. The performance of such sealed bags produced from bioriented film can be evaluated by a seal strength test designed to simulate a poultry packaging application. The test is called the "restrained shrinkage-seal strength test." In such a test, a metal frame fabricated from 3/16-inch to ¼-inch wire is employed. The frame is shaped as illustrated in FIGS. 1 and 2, and sized as set forth in Table III. As is indicated in Table III, the dimensions of the test frame employed for any particular test are dependent upon the width of the bag to be tested. In carrying out the test, the test frame is placed inside the test bag, which is then immersed in water at 95° ± 0.5°C. for 30 seconds or until seal failure occurs. The performance of the bag in this test is indicated by the time to failure of the heat seal or 30+ seconds (if no failure occurs).

Attempts to form sealed bags suitable for use in packaging frozen poultry by heat sealing bioriented films of blends of ionomers and ethylene polymers on conventional hot bar sealing equipment have been unsuccess-

TABLE III

DIMENSIONS FOR FRAMES USED IN RESTRAINED SHRINKAGE — SEAL STRENGTH TEST
DIMENSIONS (In Inches)

| BAG Width | A | B | C | D | E | F | G | R | α |
|---|---|---|---|---|---|---|---|---|---|
| 8 | 5¾ | 2 7/16 | 5⅛ | 6 | 1⅜ | 7¼ | 4⅞ | 2¼ | 60° |
| 8½ | 6 | 2½ | 5 | 6 | 7/16 | 7¾ | 5 | 2¼ | 60° |
| 9 | 6⅝ | 2¾ | 5 | 6 | 1½ | 8¼ | 4⅞ | 2¼ | 70° |
| 10 | 7¼ | 3 | 5⅞ | 7 | 1½ | 9 3/16 | 4⅞ | 2¼ | 70° |
| 11 | 8½ | 3¼ | 5⅞ | 7 | 1¾ | 10¼ | 4⅞ | 2¼ | 70° |
| 12 | 9⅜ | 3⅜ | 6 | 7 | 1⅞ | 11¼ | 4⅞ | 2¼ | 70° |
| 13 | 10 3/16 | 3¾ | 6 | 6⅞ | 1 15/16 | 12¼ | 5 | 2¼ | 70° |
| 14 | 11⅛ | 4¼ | 6⅞ | 8 | 2 | 13¼ | 4¾ | 2¼ | 70° |
| 15 | 11¾ | 4⅝ | 6⅞ | 8 | 2⅛ | 14¼ | 4⅞ | 2¼ | 70° |
| 16 | 12½ | 4⅞ | 7 | 7¾ | 2⅛ | 15¼ | 5 | 2¼ | 60° |
| 18 | 14 | 5¼ | 9 | 7⅞ | 2¼ | 17¾ | 4⅞ | 2¼ | 60° | ful as judged by the above test. Ideally, the performance in the above test should be 30+ seconds. The test performances of several such sealed bags made from bioriented films composed of ionomer/ethylene polymer blends are listed in Table IV. All performances are significantly below the ideal of 30+ seconds. Five bags made from each blend were evaluated.

TABLE IV

RESTRAIN SHRINKAGE-SEAL STRENGTH OF RESIN BLENDS AT 95°C.

| Film | Average Survival Time at 95°C., Sec. |
|---|---|
| 95% Ethylene Polymer B<br>5% Ionomer D | 6 |
| 95% Ethylene Polymer O<br>5% Ionomer D | 11 |
| 90% Ethylene Polymer P<br>10% Ionomer D | 7 |
| 90% Ethylene Polymer D<br>10% Ionomer E | 3 |

The foregoing results are surprising since bioriented films made from most of the individual components of the blends listed in Table IV could be heat sealed to make bags, and said bags would be capable of 30 seconds survival time at 95°C. as described in the above test. (The blend of Ethylene Polymer P and Ionomer D is an exception to this statement. Ethylene Polymer P is difficult to biorient as a single component, and it does not have a molecular weight, as evidenced by the melt index, sufficiently high to form adequate seal strength.)

To properly interpret the restrained shrinkage-seal strength test, the response of 30+ seconds should be understood to be an indication of superiority in the frozen poultry bag use. As noted in the description above of the frozen poultry packaging operation, the required minimum survival time is about seven seconds. The extra margin in survival time (30+ vs. 7 seconds) greatly reduces seal failure rate during packaging.

EXAMPLE 1 a. Ethylene Polymer D was blended in a 90:10 (weight) ratio with Ionomer A. A layer of the same Ethylene Polymer D was combined with a layer of the above-described blend in a tube, 0.028 inches thick and 2 11/16 inches in flat width, by coextrusion of the respective melts through a two layer annular die, 2 inches in diameter, at a temperature of 325°F. such that the inner layer, which contributed 28 percent of the total tube thickness, was composed of Ethylene Polymer D. The tubing was then cooled with an air stream and flattened through a pair of pinch rollers rotating at 4 feet/minute, and then continuously biaxially oriented by passing the tubing through a cylindrical infrared heater without contacting the heater walls, heating the tubing to a temperature below its melting point, and expanding the tubing with compressed air, 3.9 times in diameter while applying a longitudinal stretch of 3.5 times by a second set of pinch rollers rotating at 14 feet/minute. The resulting 10-inch tubing was then fabricated into bags by cutting the tubing into lengths about 24 inches long, and heat sealing one end of the length of tubing. For making 16-inch tubing, a primary tube having a 4½ inch flat width is extruded and expanded about 3.5 times in diameter.

b. A control consisting solely of the ionomer/ethylene polymer blend was also bioriented continuously by a similar process. The improvement exhibited by the multilayer films of this invention in seal strength at 95°C., as defined by the restrained shrinkage-seal strength test, without any significant reduction in tensile strength, in unrestrained shrinkage at 90°C., or in shrink force, is demonstrated by the data listed below in Table V, which also displays similar data for the films of Examples 2–4.

Table V also displays the bag width and the sealing temperatures employed for heat sealing one end of the tubular films to produce the bags. Bag length in each Example was about 24 inches. Unless otherwise indicated, in each Example a conventional one-side, hot bar heat sealing apparatus using 40 psi pressure was used for heat sealing the film, with the sealing time being 0.5 second. Total film thickness in each Example was about 2.25 mils. The values displayed in the Table for unrestrained shrink and tensile strength are averages of six tests each, and the values displayed for shrink force are averages of four tests each. Five tests were made of each film in the restrained shrinkage-seal strength test, and the results of all five tests are displayed.

EXAMPLE 2

The procedure described in Example 1 was followed, except that the ionomer content in the control (b) and in the outer layer of the film of this invention (a) was 30 weight percent, and the inner layer contributed 50 percent of the total thickness. Data showing the retention of film properties despite the addition of the inner sealing layer are also contained in Table V.

EXAMPLE 3

The procedure described in Example 1 was followed except that (1) Ethylene Polymer D was blended in a 70:30 ratio with Ionomer B, and (2) the inner layer was Ethylene Polymer G, and constituted 14 percent of the total film thickness. Data comparing this two-layer structure (a) to a single layer film (b) composed of the same ionomer/ethylene polymer blend are shown in Table V. The two-layer film, Example 3(a), performs better in the restrained shrinkage-seal strength test than the single layer film. However, the two-layer film of this Example is not as good in this test as the other two-layer films shown in Table V. The significant difference is considered to be that the inner layer of the film of Example 3(a) constitutes less than about 20 percent of the total film thickness.

EXAMPLE 4

The procedure described in Example 1 was followed except that (1) Ethylene Polymer N was blended in a 5:95 ratio with Ionomer B, and (2) the inner layer, composed of Ethylene Polymer D, comprised 72 percent of the total thickness. Data illustrating the properties are shown in Table V. This sample was difficult to produce owing to the extreme tackiness caused by the large ratio of ionomer used. Therefore, although the properties of the finished film are acceptable, the use of such a high proportion of ionomer in the outer layer is not preferred.

EXAMPLES 5–13

The procedure described in Example 1 was followed to combine the ionomer/polyethylene blend described in Example 3 with the following materials as the inner layer such that the inner layer constituted 28 percent of the total film thickness of 2¼ mils:
 5. Ethylene Polymer B;
 6. Ethylene Polymer E;
 7. Ethylene Polymer F;
 8. Ethylene Polymer H;
 9. Ethylene Polymer I;
 10. Ethylene Polymer J;
 11. Ethylene Polymer K;
 12. Ethylene Polymer L; and
 13. Ethylene Polymer M.

These films were sealed by using a one-side, hot bar sealer which contacted the film for 0.5 second with a pressure of 40 psi over a range of bar temperatures. The restrained shrinkage-seal strength values obtained when using the optimum sealing temperature for each film is displayed below in Table VI. The optimum sealing temperatures are also displayed.

EXAMPLE 14

The procedure described in Example 1 was followed except that (1) the polyethylene and ionomer were blended in a 70:30 ratio, respectively, and (2) the inner layer was composed of Ethylene Polymer A. This film was sealed as in Examples 5–13, and the resulting data are listed in Table VI.

EXAMPLE 15

The procedure described in Example 1 was followed except that (1) the polyethylene and ionomer were blended in an 80:20 ratio, respectively, and (2) the inner layer was composed of Ethylene Polymer G. This film was sealed as in Examples 5–13 and the resulting data are listed in Table VI.

EXAMPLE 16

The procedure described in Example 1 was followed except that (1) the polyethylene and ionomer were blended in an 85:15 ratio, respectively, and (2) the inner layer was composed of Ethylene Polymer D. This film was sealed as in Examples 5–13, and the resulting data are listed in Table VI.

TABLE V

FILM PROPERTIES - TWO LAYER STRUCTURES

| Example | Outer[3] Layer | Inner Layer | Bag Width, Inches | Inner Layer Thickness % of Total | Heat Seal Temp., °F. | Unrestrained Shrink at 90°C. % (MD/TD) | Shrink Force at 90°C. gm/inch-mil (MD/TD) | Tensile Strength psi (MD/TD) | Restrained Shrinkage-Seal Strength, Seconds |
|---|---|---|---|---|---|---|---|---|---|
| 1 (a) | 10% Ionomer A 90% EP D | EP D | 10 | 28 | 375 | 28/36 | 165/180 | 8400/7500 | 30+ (all five) |
| (b) | 10% Ionomer A 90% EP D | None | 16 | — | 400 | 28/36 | 135/195 | 8000/8800 | 3, 2, 2, 2, 2, |
| 2 (a) | 30% Ionomer A 70% EP D | EP D | 16 | 50 | 340 | 28/36 | 150/185 | 9200/8900 | 30+ (all five) |
| (b) | 30% Ionomer A 70% EP D | None | 16 | — | 450 | 31/40 | 135/175 | 8400/9200 | 3, 2, 2, 2, 2 |
| 3 (a) | 30% Ionomer B 70% EP D | EP G | 16 | 14 | 350 | 25/35 | 135/215 | 7800/7600 | 20, 19, 7, 6, 5 |
| (b) | 30% Ionomer B 70% EP D | None | 16 | — | 465[4] | 25/34 | 120/185 | 7600/9000 | 2, 2, 2, 2, 3 |
| 4 | 95% Ionomer B 5% EP n | EP D | 16 | 72 | 375 | 14/25 | 70/130 | 6600/7400 | 30+ (all five) |

[3] EP represents "Ethylene Polymer".
[4] Sealing pressure was 30 psi.

TABLE VI

RESTRAINED SHRINKAGE - SEAL STRENGTHS AT 95°C.

| Example | Bag Width, Inches | Ethylene Polymer Inner Layer | Melt Index of Ethylene Polymer Inner Layer | Sealing Temp., °F. | Seal Strength - Survival at 95°C., Seconds |
|---|---|---|---|---|---|
| 5[1] | 16 | B | 0.1 | 400 | 30+ (all five) |
| 6 | 16 | E | 0.8 | 375 | 30+ (all five) |
| 7 | 16 | F | 1.1 | 360 | 30+ (all five) |
| 8 | 16 | H | 2.3 | 375 | 9, 8, 8, 7, 7 |
| 9 | 16 | I | 3.0 | 375 | 3, 3, 3, 4, 5 |
| 10 | 16 | J | 3.5 | 325 | 7, 7, 5, 20, 30+ |
| 11 | 16 | K | 6.5 | 350 | 2, 2, 2, 1, 1 |
| 12 | 16 | L | 7 | 325 | 9, 8, 8, 7, 15 |
| 13 | 16 | M | 10 | 375 | 4, 3, 3, 2, 7 |
| 14[2] | 10 | A | 0.1 | 450 | 30+ (all five) |
| 15[3] | 10 | G | 1.3 | 375 | 30+ (four), 25 |
| 16[4] | 16 | D | 0.5 | 370 | 30+ (all five) |

[1] Outer Layer in EX. 5–13: 30% Ionomer B / 70% EP D
[2] Outer Layer: 30% Ionomer A / 70% EP D
[3] Outer Layer: 20% Ionomer A / 80% EP D
[4] Outer Layer: 15% Ionomer A / 85% EP D

EXAMPLES 17–20

The procedure described in Example 1 was followed to produce four bioriented films. The inner layer was composed of Ethylene Polymer B in relative thicknesses of 80, 28, 14 and 10 percent of the film total thickness (2.25 mils). The outer layer consisted of a blend of 70 parts by weight of Ethylene Polymer D and 30 parts of Ionomer B. These films were sealed as in Examples 5–13 and the resulting data are listed in Table VII.

EXAMPLE 21

The procedure described in Example 1 was followed to produce a bioriented film. The inner layer, composed of Ethylene Polymer C, comprised 28 percent of the total thickness of 2.25 mils. The outer layer was a 70:30 blend of Ethylene Polymer D:Ionomer B. The film was sealed as in Examples 5–13 and the resulting data are listed in Table VII. While the film of this Example showed superior performance in the restrained shrinkage-seal strength test at 95°C., the percent shrinkage in the transverse direction was unacceptably low (it was 15 percent). The reason for this is that the Ethylene Polymer in the inner (sealing) layer was high density polyethylene instead of low density polyethylene.

layer is to provide heat sealability. The thermoplastic layer is therefore limited to as thin a layer as possible to avoid deterioration of other properties of the structure. This invention goes beyond such prior art in that the inner sealing layer contributes more than sealability to the total bioriented film in terms of properties and processability. For example:

1. The environments to which these seals will be subjected are extreme and unusual. The family of thermoplastic materials useful in this invention are not obviously based on the prior art since the prior art (i.e., in multilayer films) has not dealt with such environments.

2. The inner layer is not limited in this invention to a thin "skin" to avoid adversely affecting the properties of the total structure. Indeed, the inner layer may constitute the major proportion of the total film thickness.

3. A "thick" sealing layer is a processing advantage because particles and gels which may emerge from one or another of the extruders will be isolated in only about half the film. This allows the remaining thickness to support the film as it passes through the draw point as the secondary bubble is formed. This increases process efficiency.

The prior art in multilayer films also includes sealing layers on biaxially oriented thermoplastic films as described in U.S. Pat. Nos. 3,380,870 and 3,508,944. In each of these cases, and unlike the present invention

TABLE VII

RESTRAINED SHRINKAGE - SEAL STRENGTHS AT 95°C.

| Example | Bag Width, Inches | Inner Layer | Sealing Temp., °F. | Relative Inner Layer Thickness % of Total | Seal Strength - Survival at 95°C., Seconds |
|---|---|---|---|---|---|
| 17 | 16 | EP B | 400 | 80 | 30+ (all five) |
| 18 | 16 | EP B | 375 | 28 | 30+ (all five) |
| 19 | 16 | EP B | 375 | 14 | 7, 5, 6, 9, 29 |
| 20 | 16 | EP B | 375 | 10 | 2 (all five) |
| 21 | 16 | EP C | 400 | 28 | 30+ (all five) |

Outer Layer: 30% Ionomer B / 70% Ethylene Polymer D
Total Film Thickness - 2.25 mils.

The prior art (in multilayer films) includes numerous examples of the use of a thermoplastic material as a heat sealable layer in laminates of various types. In such structures, the sole purpose of the thermoplastic wherein both layers are biaxially oriented, the sealing material was chosen or applied such that the inner (sealing) layer would not be oriented. The former patent describes a method of applying the sealing layer after the other layer had previously been biaxially oriented. In the latter patent, the material for the inner layer was chosen such that it would not orient at the same temperature as the other layer, i.e., it would orient at a lower temperature, but would be too hot to orient at the orientation temperature of the other layer. The purpose of the special sealing layer in each of these patents is the lowering of the sealing temperature to prevent puckering of the film at the seal, which would adversely affect film appearance.

What is claimed is:

1. A multilayer heat-shrinkable film having a shrinkage of at least 25 percent in the transverse direction at a temperature of from about 90° to about 95°C., and being suitable for use in fabricating bags for frozen poultry, said film consisting essentially of:
   a. a biaxially oriented first layer comprising a first ethylene polymer selected from the group consisting of ethylene homopolymer having a density not greater than about 0.93, and ethylene copolymer, said first ethylene polymer having a melt index of less than about 2.3; and
   b. a biaxially oriented second layer comprising a blend of an ionomer and a second ethylene polymer, said second ethylene polymer being selected from the group consisting of ethylene homopolymer having a density not greater than about 0.93, and ethylene copolymer; wherein each layer constitutes from about 20 percent to about 80 percent of the total thickness of said film.

2. The film of claim 1 wherein said first ethylene polymer is ethylene homopolymer, ethylene/vinyl acetate copolymer, ethylene/acrylic acid copolymer, ethylene/methacrylic acid copolymer, ethylene/alkyl acrylate copolymer, or ethylene/alkyl methacrylate copolymer, wherein said second ethylene polymer is ethylene homopolymer, ethylene/vinyl acetate copolymer, ethylene/acrylic acid copolymer, ethylene/methacrylic acid copolymer, ethylene/alkyl acrylate copolymer, or ethylene/alkyl methacrylate copolymer, and wherein said second ethylene polymer has a melt index of less than about 10.

3. The film of claim 1 wherein said first ethylene polymer is ethylene homopolymer, wherein said second ethylene polymer is ethylene homopolymer, and wherein said second ethylene polymer has a melt index of less than about 10.

4. The film of claim 1 wherein each of said ethylene copolymers is a copolymer of ethylene and vinyl acetate, ethyl acrylate, or acrylic acid.

5. The film of claim 2 wherein said ionomer is a copolymer of ethylene with a salt of acrylic acid or methacrylic acid.

6. The film of claim 5 wherein the cation of said salt is alkali metal or zinc.

7. The film of claim 6 wherein said alkali metal is sodium.

8. The film of claim 2 wherein said ionomer constitutes from about 1 to about 60 weight percent of said second layer.

9. The film of claim 2 wherein said ionomer constitutes from about 5 to about 40 weight percent of said second layer.

10. The film of claim 2 wherein said ionomer constitutes from about 10 to about 30 weight percent of said second layer.

11. The film of claim 2 wherein the thickness of said film is from about 1.5 to about 3 mils.

12. The film of claim 3 wherein said ionomer is a copolymer of ethylene with a salt of acrylic acid or methacrylic acid.

13. The film of claim 12 wherein the cation of said salt is alkali metal or zinc.

14. The film of claim 13 wherein said cation is zinc.

* * * * *

UNITED STATES PATENT OFFICE
CERTIFICATE OF CORRECTION

Patent No. 3,900,635       Dated August 19, 1975

Inventor(s) James Otto Funderburk, Jr. and Stephen James Vicik

It is certified that error appears in the above-identified patent and that said Letters Patent are hereby corrected as shown below:

Column 2, line 22, insert the word "seal" between the words "heat" and "strength".

Column 4, line 48, change the word "simultate" to -- simulate --.

Column 5, Table III, under heading "E", line 2, change "7/16" to read -- 1 7/16" --.

Column 7, Table V, under Example 4, change "5% EP n" to read -- 5% EP N --.

Signed and Sealed this twenty-seventh Day of January 1976

[SEAL]

Attest:

RUTH C. MASON
Attesting Officer

C. MARSHALL DANN
Commissioner of Patents and Trademarks